United States Patent
Ho et al.

(10) Patent No.: US 10,322,379 B2
(45) Date of Patent: Jun. 18, 2019

(54) COMPOSITE MEMBRANES FOR SEPARATION OF GASES

(71) Applicant: OHIO STATE INNOVATION FOUNDATION, Columbus, OH (US)

(72) Inventors: W. S. Winston Ho, Columbus, OH (US); Prabir Dutta, Worthington, OH (US); Kartik Ramasubramanian, Waynesboro, VA (US); Michael Severance, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 28 days.

(21) Appl. No.: 15/327,832

(22) PCT Filed: Jul. 21, 2015

(86) PCT No.: PCT/US2015/041282
§ 371 (c)(1),
(2) Date: Jan. 20, 2017

(87) PCT Pub. No.: WO2016/014491
PCT Pub. Date: Jan. 28, 2016

(65) Prior Publication Data
US 2017/0209838 A1     Jul. 27, 2017

Related U.S. Application Data

(60) Provisional application No. 62/027,151, filed on Jul. 21, 2014.

(51) Int. Cl.
*B01D 53/22* (2006.01)
*B01D 69/14* (2006.01)
(Continued)

(52) U.S. Cl.
CPC ......... *B01D 69/148* (2013.01); *B01D 53/228* (2013.01); *B01D 67/0079* (2013.01);
(Continued)

(58) Field of Classification Search
CPC .... B01D 69/12; B01D 53/228; B01D 71/028; B01D 71/60; B01D 67/0088; B01D 71/68;
(Continued)

(56) References Cited

U.S. PATENT DOCUMENTS 5,539,072 A * 7/1996 Wu .................... B32B 27/322
526/304
5,788,862 A * 8/1998 Degen ................ B01D 65/102
210/490

(Continued)

FOREIGN PATENT DOCUMENTS

EP        0465697 B1    1/1992

OTHER PUBLICATIONS

International Search Report and Written Opinion of the International Searching Authority, Application No. PCT/US2015/041282, dated Oct. 23, 2015, 9 pages.
(Continued)

*Primary Examiner* — Anthony R Shumate
(74) *Attorney, Agent, or Firm* — Meunier Carlin & Curfman LLC

(57) ABSTRACT

Membranes, methods of making the membranes, and methods of using the membranes are described herein. The membranes can comprise a gas permeable support layer, an inorganic layer disposed on the support, the inorganic layer comprising a plurality of discreet nanoparticles having an average particle size of less than 1 micron, and a selective polymer layer disposed on the inorganic layer, the selective polymer layer comprising a selective polymer having a
(Continued)

$CO_2:N_2$ selectivity of at least 10 at 57° C. In some embodiments, the membrane can be selectively permeable to an acidic gas. The membranes can be used, for example, to separate gaseous mixtures, such as flue gas.

19 Claims, 9 Drawing Sheets

(51) Int. Cl.
- *B01D 69/12* (2006.01)
- *B01D 71/60* (2006.01)
- *B01D 67/00* (2006.01)
- *B01D 71/02* (2006.01)
- *B01D 71/68* (2006.01)

(52) U.S. Cl.
CPC ......... *B01D 67/0088* (2013.01); *B01D 69/12* (2013.01); *B01D 71/028* (2013.01); *B01D 71/60* (2013.01); *B01D 71/68* (2013.01); *B01D 2257/2045* (2013.01); *B01D 2257/302* (2013.01); *B01D 2257/304* (2013.01); *B01D 2257/404* (2013.01); *B01D 2257/504* (2013.01); *B01D 2257/80* (2013.01); *B01D 2258/0283* (2013.01); *B01D 2258/05* (2013.01); *B01D 2323/30* (2013.01); *B01D 2325/20* (2013.01); *Y02C 10/10* (2013.01)

(58) Field of Classification Search
CPC .............. B01D 67/0079; B01D 69/148; B01D 2325/20; B01D 2323/30
See application file for complete search history.

(56) References Cited

U.S. PATENT DOCUMENTS

| 6,099,621 | A | 8/2000 | Ho |
| 8,277,932 | B2 | 10/2012 | Ho |
| 2003/0024881 | A1* | 2/2003 | Kalthod ............... B01D 53/228 210/649 |
| 2005/0087491 | A1 | 4/2005 | Hennige et al. |
| 2006/0016748 | A1* | 1/2006 | Koguma ............... B01D 67/003 210/490 |
| 2006/0105232 | A1* | 5/2006 | Tanuma ................. B82Y 30/00 429/129 |
| 2006/0251874 | A1* | 11/2006 | McClure ............ B01D 67/0027 428/210 |
| 2008/0017569 | A1* | 1/2008 | Ramsey ............. B01D 67/0004 210/490 |
| 2009/0214854 | A1* | 8/2009 | Okawara .................... C08J 5/18 428/323 |
| 2012/0031833 | A1 | 2/2012 | Ho et al. |
| 2012/0320600 | A1* | 12/2012 | Ohira ......................... C08J 5/18 362/296.01 |
| 2014/0076161 | A1* | 3/2014 | Li .......................... B01D 53/22 96/12 |
| 2015/0086801 | A1* | 3/2015 | Hiraki .................. B01J 20/3289 428/500 |
| 2015/0290591 | A1* | 10/2015 | Saukaitis ........... B01D 67/0069 427/245 |
| 2016/0354731 | A1* | 12/2016 | Mochizuki ............. B01D 63/10 |
| 2017/0028359 | A1* | 2/2017 | Singh ................. B01D 67/0088 |

OTHER PUBLICATIONS

Irfan, Umair. New material could drastically cut greenhouse gas emissions at source. Climate Wire. Published Nov. 21, 2012, 2 pages. Downloaded at http://www.eenews.net/climatewire/stories/1059972806.

Kuzniatsova, T. et al. Zeta potential measurements of zeolite Y: Application in homogeneous deposition of particle coatings. Microporous and mesoporous materials. 2007;103(1):102-107.

White, J. C. et al. Synthesis of ultrathin zeolite Y membranes and their application for separation of carbon dioxide and nitrogen gases. Langmuir: the ACS journal of surfaces and colloids. 2010;26(12)10287-93.

* cited by examiner

COMPOSITE MEMBRANES FOR SEPARATION OF GASES

CROSS REFERENCE TO RELATED APPLICATIONS

This application is a national stage application filed under 35 U.S.C. § 371 of PCT/US2015/041282 filed Jul. 21, 2015, which claims the benefit of U.S. Provisional Patent Application Ser. No. 62/027,151 filed Jul. 21, 2014, the disclosure of which is expressly incorporated herein by reference.

STATEMENT REGARDING FEDERALLY SPONSORED RESEARCH OR DEVELOPMENT

This invention was made with Government Support under Grant No. DE-FE0007632 awarded by the U.S. Department of Energy, National Energy Technology Laboratory. The Government has certain rights in the invention.

FIELD OF THE DISCLOSURE

This disclosure relates generally to membrane structures, more particularly, to membrane structures for the separation of at least one gas from a gaseous mixture.

BACKGROUND OF THE DISCLOSURE

There are numerous industrial processes that produce gas streams containing carbon dioxide, hydrogen sulfide, hydrogen chloride, nitrogen oxide, and sulfur oxide. It is often desirable to remove one or more of these gases from the other components of the gas streams, such as hydrogen and nitrogen. Inorganic membranes have been employed for a variety of gas separation applications, including hydrogen purification and carbon dioxide sequestration. However, a major limiting factor to the application of inorganic membranes is the frequent occurrence of defects which limits reproducibility, stability, and the separation performance of the membranes. There remains a need in the art for membranes, methods of making membranes, and methods of separating gases.

SUMMARY OF THE DISCLOSURE

Membranes, methods of making the membranes, and methods of using the membranes are described herein. The membranes can comprise a gas permeable support layer, an inorganic layer disposed on the gas permeable support layer, and a selective polymer layer disposed on the inorganic layer. The inorganic layer can comprise a plurality of discreet nanoparticles having an average particle size of less than 1 micron. The selective polymer layer can comprise a selective polymer having a $CO_2:N_2$ selectivity of at least 10 at 57° C. In some embodiments, the membrane can be selectively permeable to an acidic gas. In certain embodiments, the membrane can be selectively permeable to a gas selected from the group consisting of carbon dioxide, hydrogen sulfide, sulfur dioxide, sulfur trioxide, nitrogen oxide, hydrogen chloride, water, and combinations thereof.

The gas permeable support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone. In certain cases, the gas permeable support layer comprises a gas permeable polymer disposed on a base (e.g., a nonwoven fabric such as a polyester nonwoven).

The nanoparticles in the inorganic layer can comprise any suitable nanoparticles having an average particle size of less than 1 micron. The average particle size of the nanoparticles in the inorganic layer can be from 1 nm to 200 nm (e.g., from 1 nm to 50 nm). In some embodiments, the nanoparticles in the inorganic layer can comprise alkaline earth metal oxide nanoparticles, transition metal oxide nanoparticles, lanthanide metal oxide nanoparticles, group IVA metal oxide nanoparticles, transition metal nanoparticles, transition-metal catalyst nanoparticles, nanoparticles comprising a transition metal adsorbed on a non-reactive support, metal alloy nanoparticles, silicate nanoparticles, alumino-silicate nanoparticles, nanoparticles comprising clays, and combinations thereof. In certain embodiments, the nanoparticles in the inorganic layer can be chosen from silicate nanoparticles, alumino-silicate nanoparticles, or combinations thereof. In certain embodiments, the nanoparticles can comprise zeolite nanoparticles. The zeolite nanoparticles can have varying frameworks and differing Si/Al rations. For example, the nanoparticles can be zeolite Y nanoparticles.

The selective polymer can comprise a selective polymer that has a $CO_2:N_2$ selectivity of from 10 to 500 (e.g., from 75 to 350) at 57° C. The selective polymer can comprise a hydrophilic polymer, an amino compound, or a combination thereof. In some embodiments, the hydrophilic polymer can be absent. In other embodiments, the selective polymer can comprise a combination of a hydrophilic polymer and an amino compound. For example, the selective polymer can comprise an amino compound dispersed in a hydrophilic polymer matrix.

The amino compound can be, for example, an amine-containing polymer, a low molecular weight amino compound, or a combination thereof. In some embodiments, the amino compound comprises an amine-containing polymer, such as polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amino compound can comprise a low molecular weight amino compound, such as a salt of a primary amine or a salt of a secondary amine.

The hydrophilic polymer can comprise, for example, a polymer selected from the group consisting of polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the selective polymer can further comprise a cross-linking agent, such as formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

Methods of making the membranes disclosed herein are also provided. Methods of making membranes can include depositing a nanoparticle dispersion on a gas permeable support layer to form an inorganic layer disposed on the gas permeable support layer. The nanoparticle dispersion can comprise a plurality of discreet nanoparticles having an average particle size of less than 1 micron in a suitable fluid carrier. In some embodiments, depositing the nanoparticle dispersion on the gas permeable support layer can comprise vacuum-assisted dip-deposition of the nanoparticle dispersion on the gas permeable support layer. Methods can further include coating the inorganic layer with a selective polymer (e.g., a selective polymer that exhibits a $CO_2:N_2$ selectivity of at least 10 at 57° C.).

Methods for separating a gaseous mixture comprising a first gas and a second gas are also provided. The method can include contacting any of the disclosed membrane with the gaseous mixture under conditions effective to afford transmembrane permeation of the first gas.

DETAILED DESCRIPTION

Figure 1:
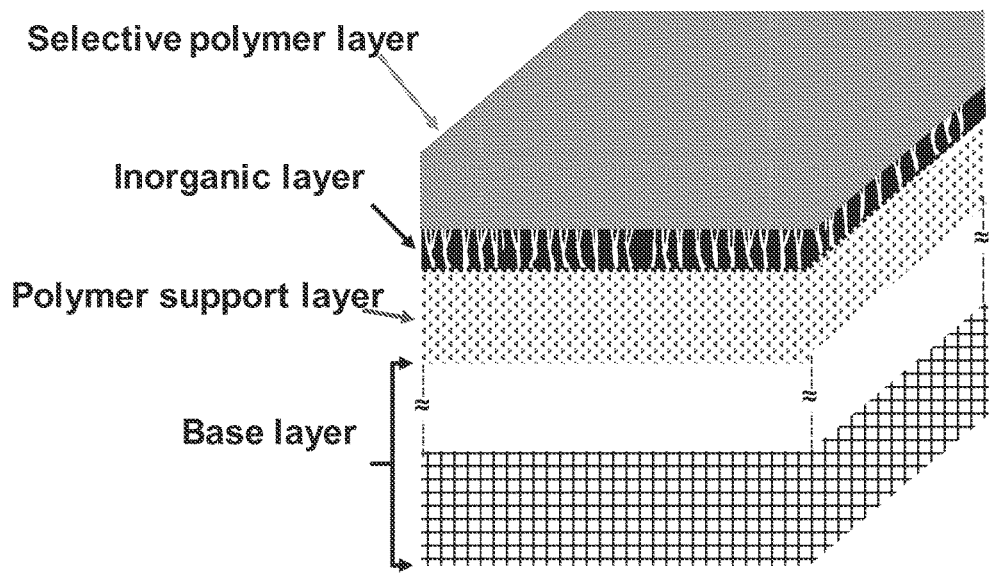
FIG. 1 is a schematic of a composite membrane disclosed.

Membranes, methods of making the membranes, and methods of using the membranes are described herein. The membranes can comprise a gas permeable support layer, an inorganic layer disposed on the gas permeable support layer, and a selective polymer layer disposed on the inorganic layer. The inorganic layer can comprise a plurality of discreet nanoparticles having an average particle size of less than 1 micron. The selective polymer layer can comprise a selective polymer having a $CO_2:N_2$ selectivity of at least 10 at 57° C. The gas permeable support layer, the inorganic layer, and the selective polymer layer can optionally comprise one or more sub-layers.

The gas permeable support layer can be a porous layer that comprises a plurality of substantially connected pores. "Substantially connected" as used herein, refer to pores that are connected with each other, and substantially extend from a surface of the support layer to an inner portion of the support layer.

The gas permeable support layer can be formed from any suitable material. The material used to form the gas permeable support layer can be chosen based on the end use application of the membrane. In some embodiments, the gas permeable support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, polymeric organosilicones, fluorinated polymers, polyolefins, copolymers thereof, or blends thereof. Specific examples of polymers in the gas permeable support layer can include polydimethylsiloxane, polydiethylsiloxane, polydi-isopropylsiloxane, polydiphenylsiloxane, polyethersulfone, polyphenylsulfone, polysulfone, partially fluorinated or perfluorinated derivatives thereof, copolymers thereof, or blends thereof. In some embodiments, the gas permeable polymer can be polyethersulfone. If desired, the gas permeable support layer can include inorganic particles to increase the mechanical strength without altering the permeability of the support layer.

In certain embodiments, the gas permeable support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester.

The inorganic layer can comprise a plurality of discreet nanoparticles having an average particle size of less than 1 micron. The inorganic layer can comprise multiple pores and/or channels formed between the nanoparticles and/or within the nanoparticles. The pores and/or channels formed can be in fluid contact with the gas permeable support layer.

The nanoparticles in the inorganic layer can have any suitable size and shape. For example, the nanoparticles can be spherical, cylindrical, or rod-like. In some embodiments, the nanoparticles can have an average particle size of less than 1 micron (e.g., less than 750 microns, less than 500 microns, less than 250 microns, less than 200 microns, less than 150 microns, less than 100 microns, less than 50 microns, or less than 25 microns. In some embodiments, the nanoparticles can have an average particle size of at least 1 nm (e.g., at least 5 nm, at least 10 nm, at least 15 nm, or at least 25 nm). The nanoparticles can have an average particle size ranging from any of the minimum values described above to any of the maximum values described above. For example, in certain embodiments, the nanoparticles can have an average particle size of from 1 nm to 200 nm (e.g., from 1 nm to 150 nm, from 1 nm to 100 nm, or from 1 nm to 50 nm). The term "average particle size," as used herein, generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Mean particle size can be measured using methods known in the art, such as dynamic light scattering or electron microscopy.

In some embodiments, the nanoparticles in the inorganic layer comprise a population of nanoparticles having a monodisperse particle size distribution. The term "monodisperse," as used herein, describes a population of nanoparticles where all of the nanoparticles are the same or nearly the same size. As used herein, a monodisperse particle size distribution refers to particle distributions in which 80% of the distribution (e.g., 85% of the distribution, 90% of the distribution, or 95% of the distribution) lies within 20% of the median particle size (e.g., within 15% of the median particle size, within 10% of the median particle size, or within 5% of the median particle size).

The nanoparticles can be formed from a variety of suitable materials. In certain embodiments, the nanoparticles can be selected to have a surface chemistry that is compatible with the selective polymer layer, the gas permeable support layer, or a combination thereof. For example, in certain cases, the nanoparticle can comprise hydrophilic nanoparticles. Examples of suitable nanoparticles include alkaline earth metal oxide nanoparticles, transition metal oxide nanoparticles, lanthanide metal oxide nanoparticles, group IVA metal oxide nanoparticles, transition metal nanoparticles, transition-metal catalyst nanoparticles, nanoparticles comprising a transition metal adsorbed on a non-reactive support, metal alloy nanoparticles, silicate nanoparticles, alumino-silicate nanoparticles, nanoparticles comprising clays, and combinations thereof. Specific examples of nanoparticles include alumina nanoparticles, silica nanoparticles, zeolite nanoparticles, titania nanoparticles, zirconia nanoparticles, palladium nanoparticles, platinum nanoparticles, nickel nanoparticles, transition-metal catalyst nanoparticles, and combinations thereof.

In certain embodiments, the nanoparticles in the inorganic layer can be chosen from silicate nanoparticles, alumino-silicate nanoparticles, or combinations thereof. In certain embodiments, the nanoparticles can comprise zeolite nanoparticles. The zeolite nanoparticles can comprise zeolites having varying frameworks and differing Si/Al rations. For example, the nanoparticles can be zeolite Y nanoparticles.

The membranes can further include a selective polymer layer disposed on the inorganic layer. In some cases, the selective polymer layer can be a selective polymer through which gas permeates via diffusion or facilitated diffusion. The selective polymer layer can comprise a selective polymer having a $CO_2$:$N_2$ selectivity of at least 10 at 57° C. For example, the selective polymer can have a $CO_2$:$N_2$ selectivity of at least 25 at 57° C. (e.g., at least 50 at 57° C., at least 75 at 57° C., at least 100 at 57° C., at least 200 at 57° C., at least 250 at 57° C., at least 300 at 57° C., at least 350 at 57° C., or at least 400 at 57° C.). In some embodiments, the selective polymer can comprise a selective polymer that has a $CO_2$:$N_2$ selectivity of 500 or less. In certain embodiments, the selective polymer can comprise a selective polymer that has a $CO_2$:$N_2$ selectivity ranging from any of the minimum values described above to any of the maximum values described above. For example, in certain embodiments, the selective polymer can comprise a selective polymer that has a $CO_2$:$N_2$ selectivity of from 10 to 500 (e.g., from 75 to 350) at 57° C. The $CO_2$:$N_2$ selectivity of the selective polymer can be measured using standard methods for measuring gas permeance known in the art, such as those described in the examples below.

The selective polymer can comprise a hydrophilic polymer, an amino compound, or a combination thereof. In some embodiments, the hydrophilic polymer can be absent. In other embodiments, the selective polymer can comprise a combination of a hydrophilic polymer and an amino compound. For example, the selective polymer can comprise an amino compound (e.g., a small molecule or a polymer) dispersed in a hydrophilic polymer matrix.

In some embodiments, the amino compound can include a compound (e.g., a small molecule or a polymer) comprising one or more primary amine moieties and/or one or more secondary amine moieties. The amino compound can be, for example, an amine-containing polymer, a low molecular weight amino compound (i.e., a small molecule), or a combination thereof.

In some embodiments, the amino compound comprises an amine-containing polymer (also referred to herein as a "fixed carrier"). The amine-containing polymer can have any suitable molecular weight. For example, the amine-containing polymer can have a weight average molecular weight of from 5,000 Da to 2,000,000 Da, or from 50,000 Da to 200,000 Da. Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 100,000 Da). In some embodiments when the amino compound comprises an amine-containing polymer, the hydrophilic polymer is absent. In some embodiments when the amino compound comprises an amine-containing polymer, the selective polymer layer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"). The low molecular weight amino compound can have a molecular weight of 1,000 Da or less (e.g., 800 Da or less, 500 or less, 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine. In some embodiments when the amino compound comprises a low molecular weight amino compound, the selective polymer layer can comprise a blend of the low molecular weight amino compound and a hydrophilic polymer (e.g., a low molecular weight amino compound dispersed in a hydrophilic polymer matrix).

In some cases, the low molecular weight amino compound can include an aminoacid salt having the formula:

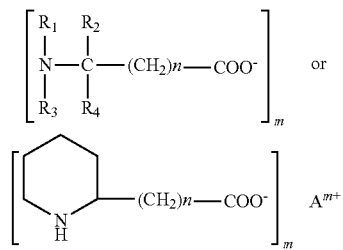

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

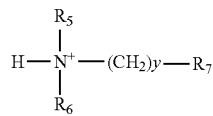

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

The selective polymer layer can comprise any suitable amount of the amino compound. For example, in some embodiments, the hydrophilic polymer can be absent. In these embodiments, the selective polymer layer can comprise from 100% to 80% by weight amino compound, based on the total weight of the components used to form the selective polymer layer. In some cases, the selective polymer layer can comprise from 10% to 90% by weight (e.g., from 10% to 50% by weight) amino compound, based on the total weight of the components used to form the selective polymer layer.

Optionally, the selective polymer layer can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da.

The selective polymer layer can comprise any suitable amount of the hydrophilic polymer. For example, in some cases, the selective polymer layer can comprise from 10% to 90% by weight (e.g., from 10% to 50% by weight) hydrophilic polymer, based on the total weight of the components used to form the selective polymer layer.

In some embodiments, the selective polymer can also include a cross-linking agent. Cross-linking agents suitable for use in the selective polymer can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer can comprise any suitable amount of the cross-linking agent. For example, the selective polymer can comprise 1 to 40 percent cross-linking agents by weight of the selective polymer.

The selective polymer layer can further include a base. The base can act as a catalyst to catalyze the cross-linking of the selective polymer layer (e.g., cross-linking of a hydrophilic polymer with an amine-containing polymer). In some embodiments, the base can remain in the selective polymer and constitute a part of the selective polymer. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer can comprise any suitable amount of the base. For example, the selective polymer can comprise 1 to 40 percent base by weight of the selective polymer If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective layer can have a thickness of from 50 nanometers to 5 microns (e.g., from 50 nm to 2 microns, or from 100 nanometers to 750 nanometers, or from 250 nanometers to 500 nanometers). In some embodiments, the inorganic layer can have a thickness of from 50 nanometers to 5 microns (e.g., from 50 nm to 2 microns, or from 100 nanometers to 750 nanometers, or from 250 nanometers to 500 nanometers). In some embodiments, the gas permeable support layer can have a thickness of from 1 micron to 500 microns (e.g., from 50 to 250 microns). In some cases, the membranes disclosed herein can have a thickness of from 5 microns to 500 microns.

Methods of making the membranes are also disclosed herein. Methods of making membranes can include depositing a nanoparticle dispersion on a gas permeable support layer to form an inorganic layer disposed on the gas permeable support layer. The nanoparticle dispersion can comprise a plurality of discreet nanoparticles having an average particle size of less than 1 micron in a suitable fluid carrier. In some embodiments, depositing the nanoparticle dispersion on the gas permeable support layer can comprise vacuum-assisted dip-deposition of the nanoparticle dispersion on the gas permeable support layer. Methods can further include coating the inorganic layer with a selective polymer (e.g., a selective polymer that exhibits a $CO_2:N_2$ selectivity of at least 10 at 57° C.).

In one example method of preparing a membrane disclosed herein, zeolite nanoparticles can be dispersed in water via ultrasonication. During sonication, the water can be changed intermittently to prevent a temperature rise. The nanoparticle dispersion can then be deposited onto a gas permeable support layer using a vacuum-assisted dip-depositing set-up, which is shown schematically in FIG. 2. In this set-up, there is a circular or rectangular holder with a hollow handle connected to a Duoseal 1405 liquid ring vacuum pump. The holder has evenly placed grooves for uniform distribution of the vacuum. A porous base, such as a metal plate is held on the holder by the vacuum. The support to be coated can then be fixed and flattened on the metal plate by both tape and vacuum. The top surface of a gas permeable support can then be dipped tangentially (as in crossflow filtration) into the dispersion and then taken out. The vacuum in addition to assisting the layer formation helps to keep the support flat during the deposition process. After the deposition, the inorganic nanoparticle layer can be dried overnight at room temperature prior to further characterization. The inorganic layer can be characterized by Scanning Electron Microscopy (SEM) and/or Dynamic Light Scattering. Pretreatment of the gas permeable support polymer may be necessary to remove water or other adsorbed species using methods appropriate to the support and the adsorbate. Examples of absorbed species are, for example, water, alcohols, porogens, and surfactant templates.

The selective polymer can be prepared by first forming a casting solution of a hydrophilic polymer, an amino compound, and optionally a cross-linking agent and a basic compound in a suitable solvent. One example of a suitable solvent is water. In some embodiments, the amount of water employed will be in the range of from 50% to 99%, by weight of the casting solution. The casting solution can then be used in forming a nonporous selective polymer membrane. The selective polymer can be formed into a nonporous membrane by using any suitable techniques. For example, the casting solution can be cast onto a substrate using any suitable techniques, and the solvent may be evaporated such that a nonporous membrane is formed on the substrate. Examples of suitable casting techniques include, but are not limited to, "knife casting" or "dip casting". Knife casting include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip casting include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc.

In some embodiments, membranes formed from selective polymers containing for example, the hydrophilic polymer, the cross-linking agent, the base, and the amino compound in a suitable solvent can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be cast onto the top layer of the support coated with the inorganic layer and the solvent evaporated, as discussed above. In some embodiments, a higher degree of cross-linking for the selective polymer after solvent removal takes place at about 100° C. to about 180° C., and the cross-linking occurs in from about 1 to about 72 hours.

An additive may be included in the selective polymer before forming the selective layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making the membrane can be scaled to industrial levels.

The membranes disclosed herein can be used for separating a gaseous mixture comprising a first gas and a second gas. For example, the membranes can be used to separate an acidic gas from a gaseous mixture containing at least one acidic gas. Methods of using the membrane can include contacting the membrane, on the side comprising the selective polymer, with the gaseous mixture under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprises at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, the membrane can be used at temperatures less than 100° C.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, or combinations thereof. In some embodiments, the membrane can be selective to hydrogen sulfide versus hydrogen, nitrogen, or combinations thereof. In some embodiments, the membrane can be selective to hydrochloric acid gas versus hydrogen, nitrogen, or combinations thereof. In some embodiments, the acid gas may be derived from fossil fuels that require hydrogen purification for fuel cell, electricity generation, and hydrogenation applications, biogas for renewable energy, and natural gas for commercial uses. The membranes can also be used for removal of carbon dioxide from flue gas.

The permeance of the first gas or the acid gas can be at least 50 GPU at 57° C. In some embodiments, the permeance of the first gas or the acid gas through the membranes can be up to 3,000 GPU at 57° C. For example, the permeance of the first gas or the acid gas through the membranes can be 50 GPU or greater, 100 GPU or greater, 150 GPU or greater, 200 GPU or greater, 500 GPU or greater, 1,000 GPU or greater, 1,500 GPU or greater, or 2,000 GPU or greater at 57° C. The membrane can exhibit a first gas:second gas selectivity of at least 10 at 57° C. In some embodiments, the membrane can exhibit a first gas:second gas selectivity of up to 500 at 57° C. For example, the membrane can exhibit a first gas:second gas selectivity of 10 or greater, 50 or greater, 100 or greater, 150 or greater, 200 or greater, 250 or greater, 300 or greater, or 350 or greater at 57° C. In some embodiments, the permeance and selectivity of the membrane for the first gas or the acid gas can vary at higher or lower temperatures.

EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts are parts by weight, temperature is in ° C. or is at ambient temperature, and pressure is at or near atmospheric.

Example 1

Figure 2:
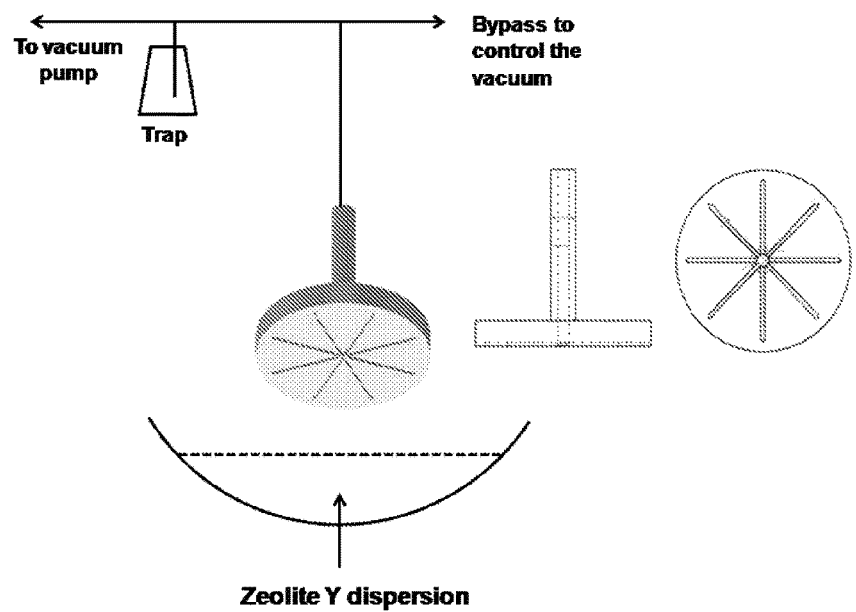
FIG. 2 is a schematic of a vacuum-assisted dip-depositing set-up.

Synthesis of a Layer of 200-Nm Zeolite Y Particles on a Polyethersulfone Support Using Vacuum-Assisted Dip-Deposition Zeolite Y particles (0.5 wt % based on the dispersion) with an average particle size of about 200 nm were dispersed in deionized water. The dispersion was ultrasonicated at room temperature for about 90 minutes, changing the water intermittently (about every 15 minutes) to prevent a temperature rise. A free-standing polyethersulfone (PES) support (Sterlitech Corporation; commercially specified pore size: 30 nm) was taped onto a flat porous metal plate supported on a holder as shown in FIG. 2.

Figure 3:
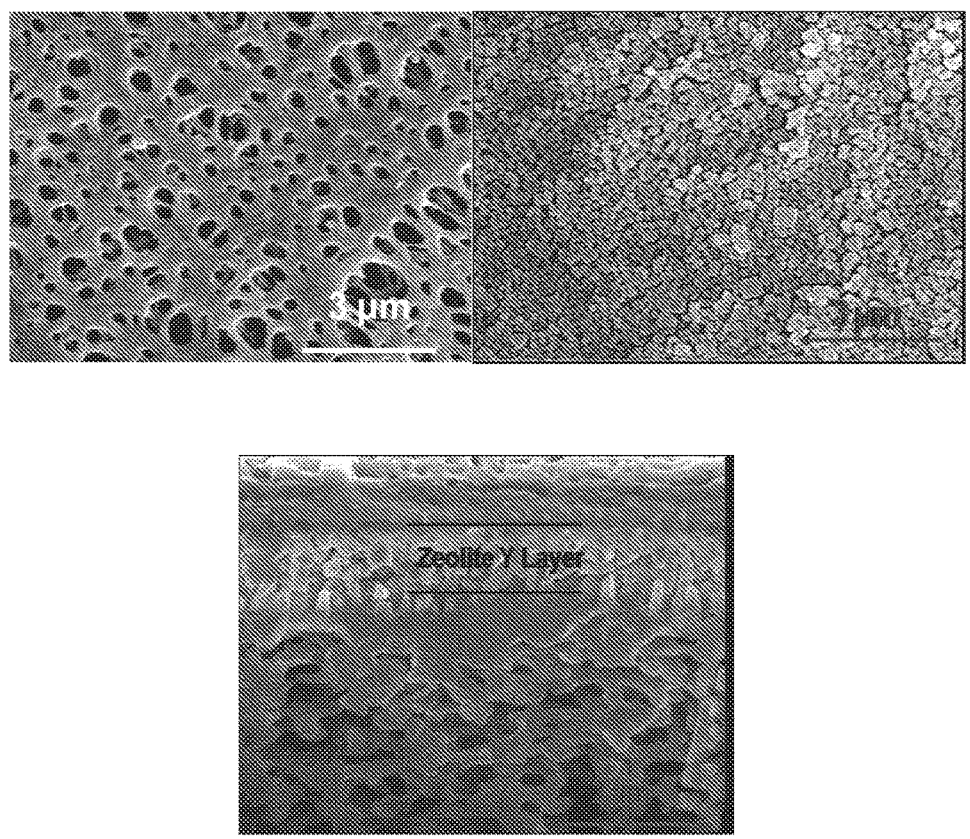
FIG. 3 shows photographs of a Sterlitech PES support (top left, SEM), a top view of Zeolite Y nanoparticles deposited on the PES support (top right, SEM), and a cross-section of the deposited Zeolite Y deposited on the support (bottom).

The top surface of the support was then dipped (lasting for about 2 seconds) tangentially into the zeolite dispersion and then taken out. A vacuum was used to keep the support flat during the deposition process as well as assist in layer formation. A bypass was used to control the downstream vacuum, if needed. When the bypass was completely closed, the downstream pressure went down to about 3 inches Hg. The deposited zeolite layer was dried overnight at room temperature prior to characterization by scanning electron microscopy (SEM) for top views and by SEM combined with focused ion beam (FIB) etching for cross-sectional views. For comparison of the deposited layer with the polymer support substrate, the top surface of the substrate was also analyzed by SEM. The images are shown in FIG. 3.

The top views show a good coverage of randomly close-packed zeolite Y particles on the polymer support substrate. The cross-sectional view shows a thickness of less than 1 µm for the Zeolite Y layer.

Example 2

Figure 4:
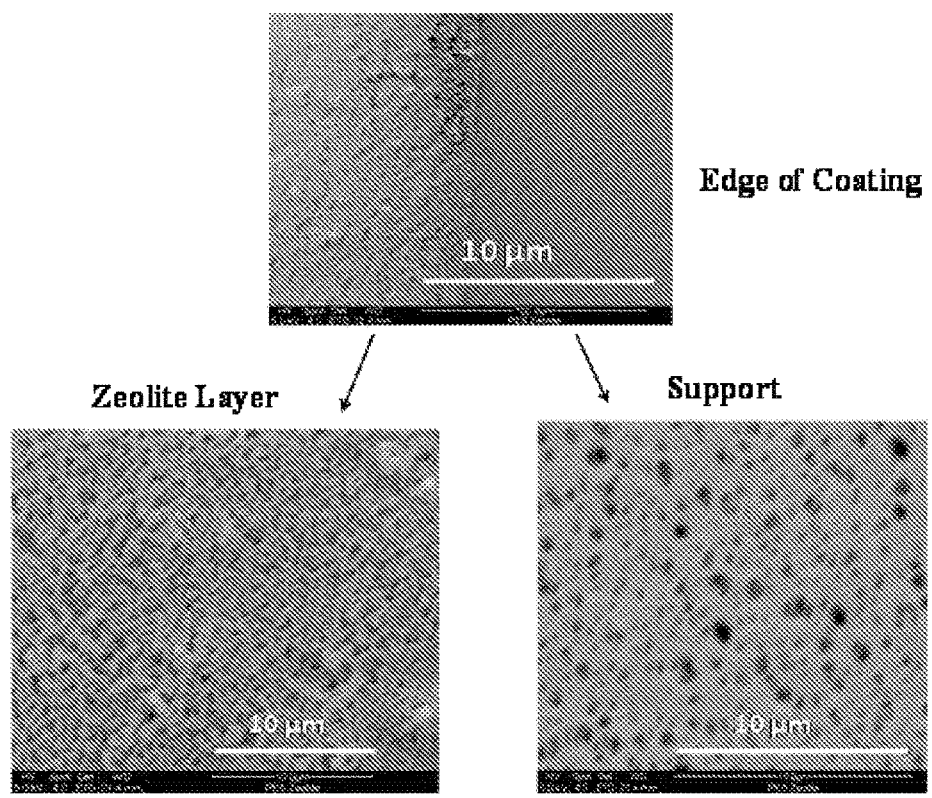
FIG. 4 shows photographs of Zeolite Y nanoparticles deposited on a PES support (top, SEM), a top view of the Zeolite Y layer (bottom right, SEM), and a top view of the PES support (bottom left, SEM).

Synthesis of a Layer of 200-Nm Zeolite Y Particles on a Polyethersulfone Support Using Dip-Deposition without Vacuum Zeolite Y particles (0.5 wt % based on the dispersion) with an average particle size of about 200 nm were dispersed in deionized water. The dispersion was ultrasonicated at room temperature for about 90 minutes, changing the water intermittently (about every 15 minutes) to prevent a temperature rise. A free-standing polyethersulfone (PES) support was taped and flattened onto a glass plate. The Zeolite dispersion was spread evenly on the support after which it was allowed to stand in a vertical position, thereby draining all the liquid. The zeolite layer was dried overnight at room temperature prior to characterization by SEM. The images are shown in FIG. 4.

The images show a good coverage of Zeolite Y particles on the polymer support. However, the packing of the Zeolite Y particles was not as closely packed as that obtained with the vacuum, as shown in FIG. 3.

Example 3

Synthesis of a Layer of 40-Nm Zeolite Y Particles on a Polyethersulfone Support Using Vacuum-Assisted Dip-Deposition Zeolite Y particles (0.58 wt % based on the dispersion) with an average particle size of about 40 nm were dispersed in deionized water. The dispersion was ultrasonicated at room temperature for about 40 minutes, changing the water intermittently (about every 15 minutes) to prevent a temperature rise. A composite polyethersulfone (PES)/polypropylene support (EMD Millipore, Inc. (molecular wt cut-off: 1000 kDa) was taped onto a flat porous metal plate supported on a holder as shown in FIG. 2. Millipore PES supports are sold with glycerol in the pores which was removed by washing with water followed by dipping (lasting for about 30 minutes) in isopropanol (IPA). A bypass was used to control the downstream vacuum, if needed.

Figure 5:
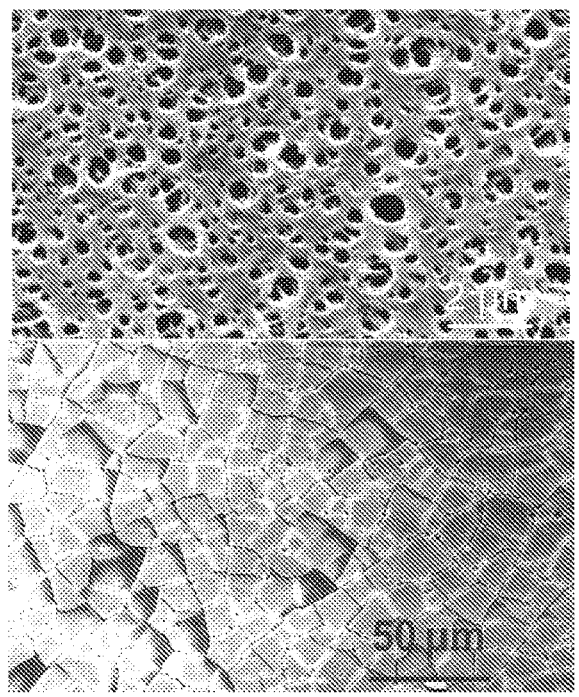
FIG. 5 shows photographs of a Sterlitech PES support (left, SEM) and a top view of the Zeolite Y nanoparticles deposited on the PES support (right, SEM).

The top surface of the support was then dipped (lasting for about 2 seconds) tangentially into the zeolite dispersion and then taken out. A vacuum was used to keep the support flat during the deposition process as well as assist in layer formation. A bypass was used to control the downstream vacuum, if needed. When the bypass was completely closed, the downstream pressure went down to about 3 inches Hg. The deposited zeolite layer was dried overnight at room temperature prior to characterization by scanning electron microscopy (SEM) for top views. For comparison of the deposited layer with the polymer support substrate, the top surface of the substrate was also analyzed by SEM. The images are shown in FIG. 5.

The Zeolite Y layer was shown to be cracked, presumably due to the relatively large thickness of the layer with small zeolite particles.

Example 4

Synthesis of a Layer of 40-Nm Zeolite Y Particles on a Polyethersulfone Support Using Vacuum-Assisted Dip-Deposition and a Dispersion Concentration of 0.1 wt %

Zeolite Y particles (0.1 wt % based on the dispersion) with an average particle size of about 40 nm were dispersed in deionized water. The dispersion was ultrasonicated at room temperature for about 40 minutes, changing the water intermittently (about every 15 minutes) to prevent a temperature rise. A composite polyethersulfone (PES)/polypropylene support was taped onto a flat porous metal plate supported on a holder as shown in FIG. 2. Glycerol in the Millipore PES support was removed by washing with water followed by dipping (lasting for about 30 minutes) in isopropanol (IPA). A bypass was used to control the downstream vacuum, if needed.

Figure 6:
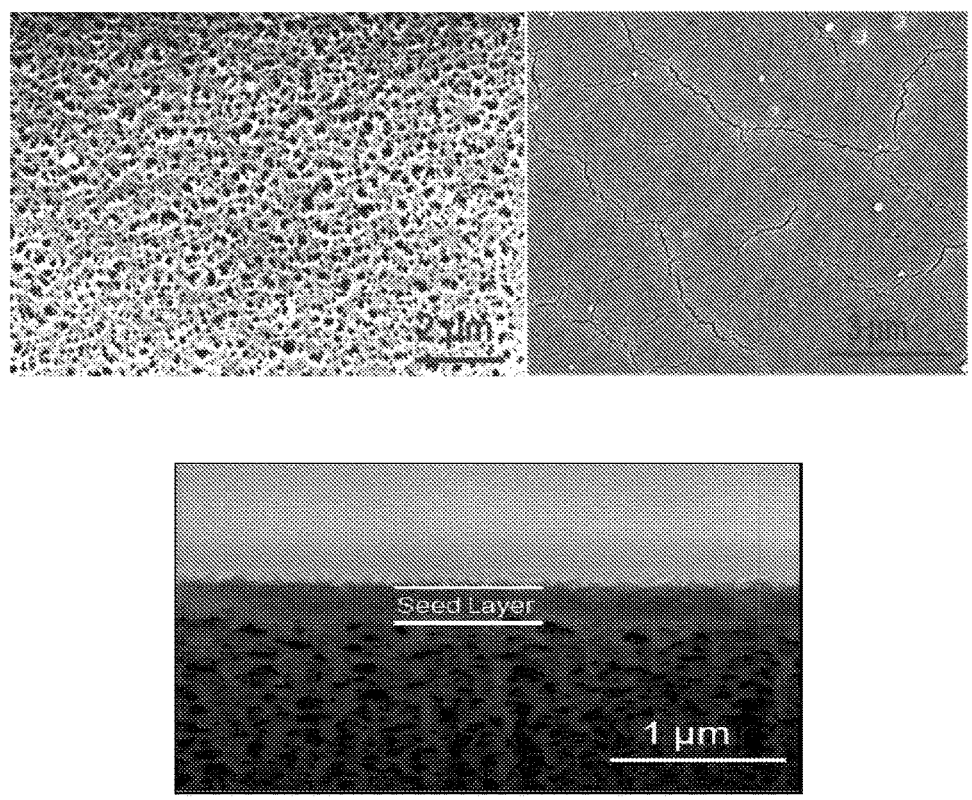
FIG. 6 shows photographs of a top view of Zeolite Y nanoparticles deposited on the PES support at low magnification (top right, SEM), Zeolite Y nanoparticles at higher magnification (top right, SEM), and a cross-section of the deposited Zeolite Y layer (bottom).
Figure 7:
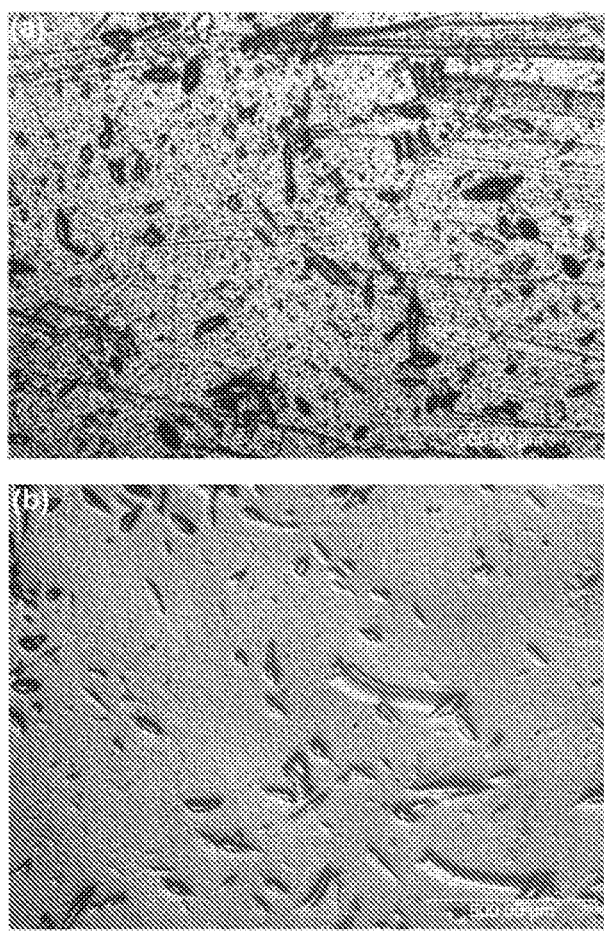
FIG. 7 shows photographs of hydrophilic Zeolite Y nanoparticles (top) and hydrophobically modified Zeolite Y nanoparticles (bottom) deposited on a polymer support.
Figure 8:
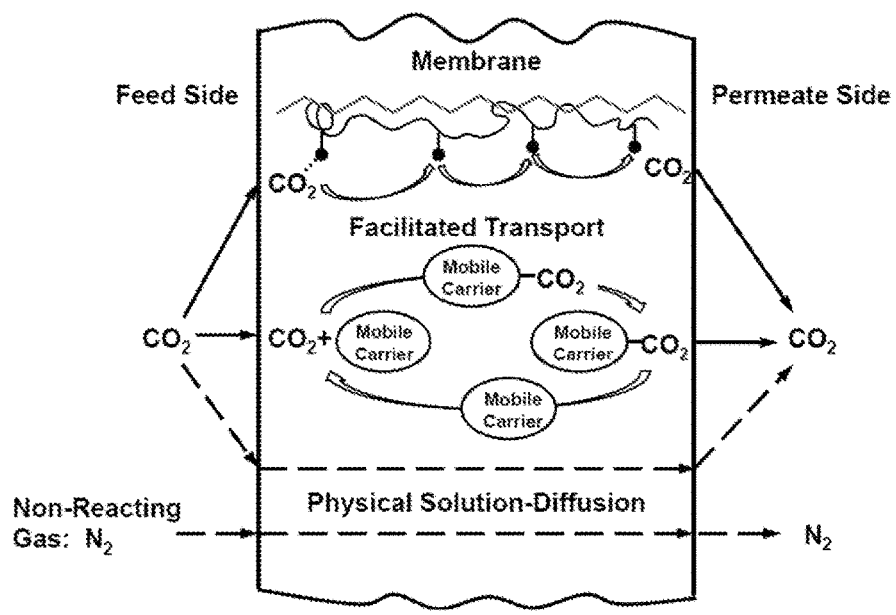
FIG. 8 is a schematic of the mechanism by which an amine-containing polymer layer, containing fixed and mobile carriers, transports carbon dioxide.
Figure 9:
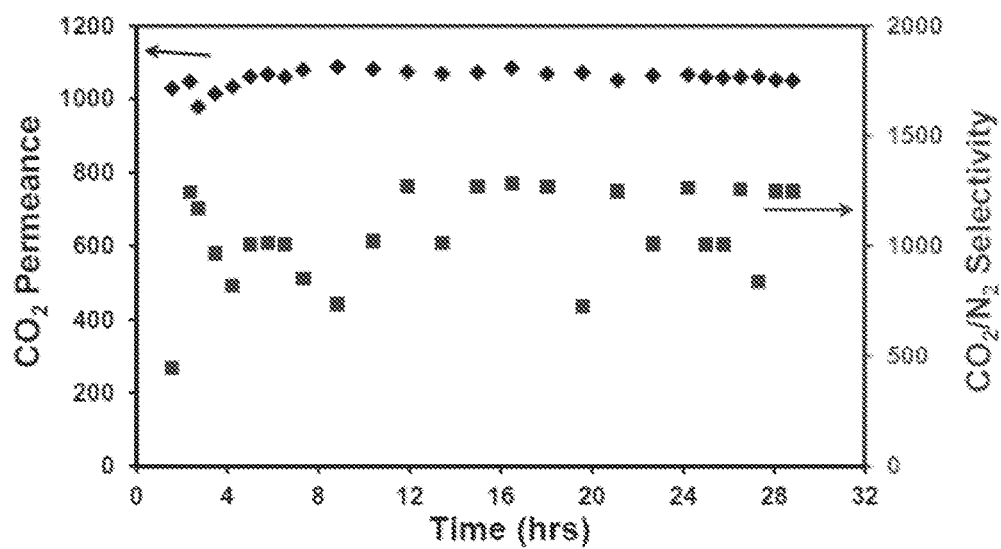
FIG. 9 shows a graph of carbon dioxide permeance and carbon dioxide:nitrogen selectivity of an amine-based selective layer on zeolite Y nanoparticles (40 nm) tested at 102° C. with 80% water in the feed stream.
Figure 10:
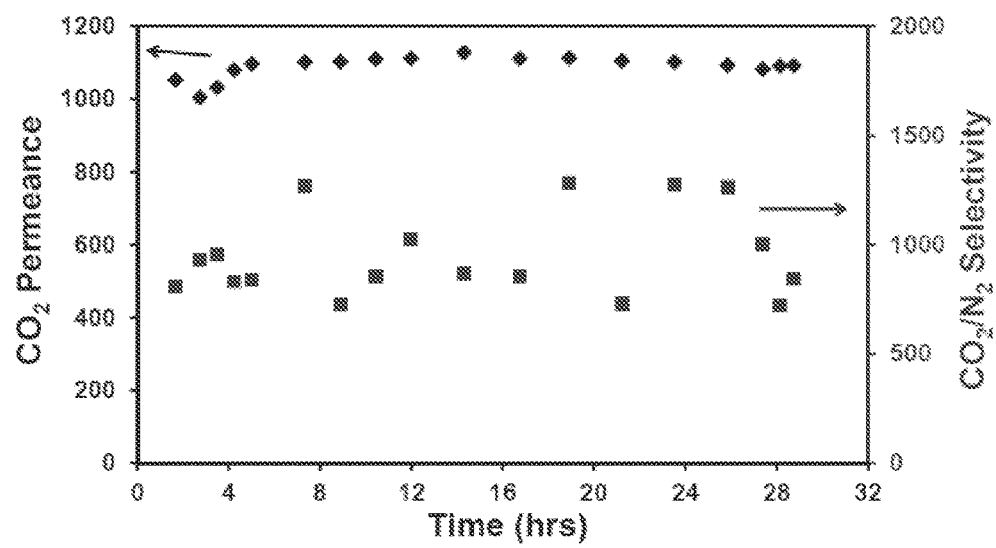
FIG. 10 shows a graph of carbon dioxide permeance and carbon dioxide:nitrogen selectivity of an amine-based selective layer on zeolite Y nanoparticles (40 nm) tested at 102° C. with 80% water in the feed stream with sulfur dioxide concentration less than 1 ppm.
Figure 11:
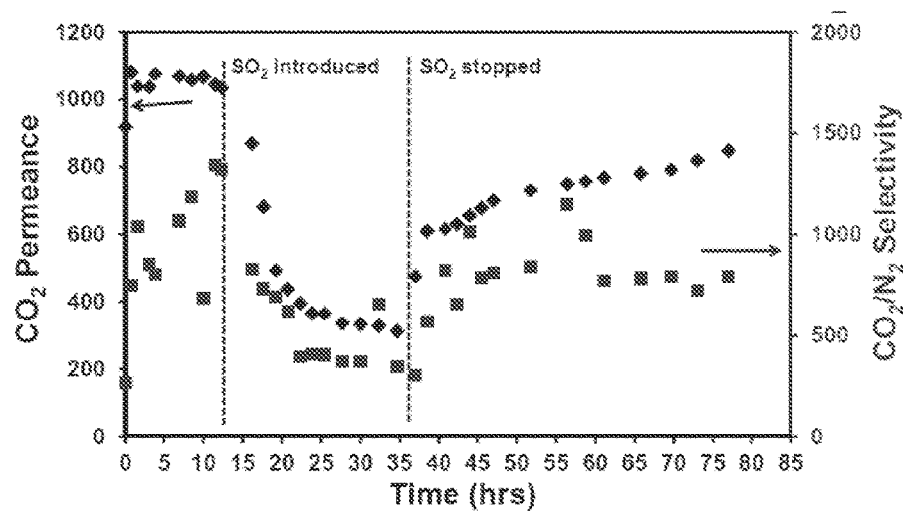
FIG. 11 shows a graph of carbon dioxide permeance and carbon dioxide:nitrogen selectivity of an amine-based selective layer on zeolite Y nanoparticles (40 nm) tested at 102° C. with 80% water in the feed stream with sulfur dioxide concentration of about 5 ppm.
Figure 12:
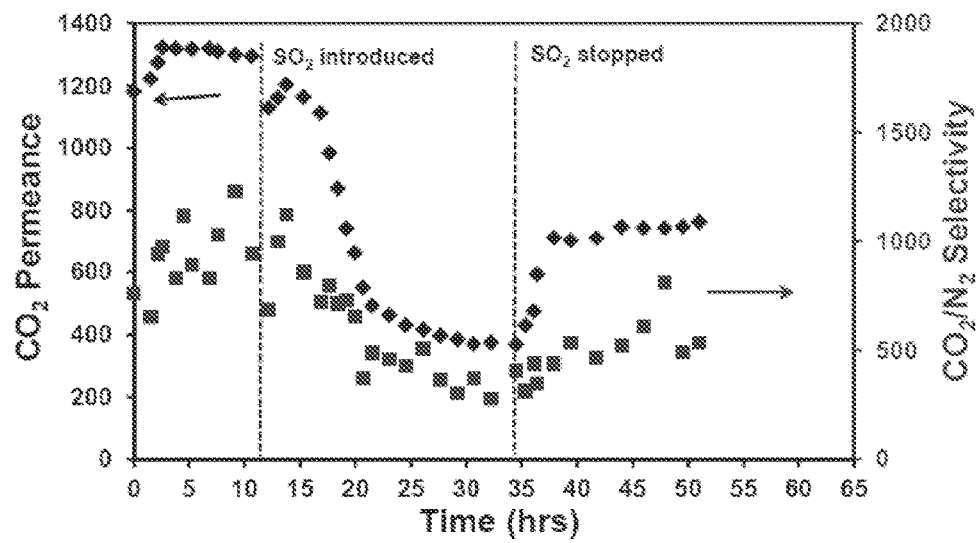
FIG. 12 shows a graph of carbon dioxide permeance and carbon dioxide:nitrogen selectivity of an amine-based selective layer on zeolite Y nanoparticles (40 nm) tested at 102° C. with 80% water in the feed stream with sulfur dioxide concentration of about 5 ppm.
Figure 13:
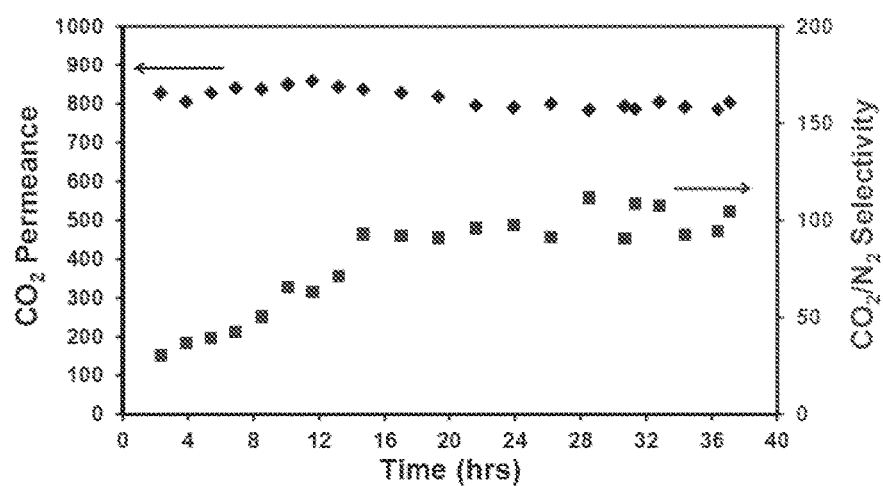
FIG. 13 shows a graph of carbon dioxide permeance and carbon dioxide:nitrogen selectivity of an amine-based selective layer on zeolite Y nanoparticles (40 nm) tested at 102° C. with 80% water in the feed stream.

The top surface of the support was then dipped (lasting for about 2 seconds) tangentially into the zeolite dispersion and then taken out. A vacuum was used to keep the support flat during the deposition process as well as assist in layer formation. A bypass was used to control the downstream vacuum, if needed. When the bypass was completely closed, the downstream pressure went down to about 3 inches Hg. The deposited zeolite layer was dried overnight at room temperature and 70% relative humidity prior to characterization by scanning electron microscopy (SEM) for top views and by SEM combined with focused ion beam etching for a cross-sectional view. The images are shown in FIG. 6.

The Zeolite Y layer showed cracks of much smaller width than those shown in Example 3. This was presumably due to the reduction in dispersion concentration and the associated layer thickness. The cross-section shows a thickness of <400 nm for the zeolite layer which may be desirable for applications that may involve such multilayer composites including as membranes.

Example 5

Synthesis of a Polydimethylsiloxane Covered Zeolite/Polyethersulfone Multilayer Composite Membrane with 200-Nm Zeolite Particles Zeolite Y particles with an average particle size of about 200 nm were deposited on Millipore 1000 kDa PES support as described in Example 1. The membrane was spin-coated with a polydimethylsiloxane (PDMS; Wacker Silicones, Dehesive® 944; 30-40% solution in an organic solvent) solution as follows. Dehesive® 944 (2.5 g) was dissolved in heptane (16.2 g) followed by addition of a corresponding cross-linker and catalyst in the ratio of 100:1:0.5 (PDMS: crosslinker:catalyst) to form a PDMS solution. The PDMS solution (about 1 ml) was spread evenly on the support. The membrane was spun at a spinning speed of about 1000 rpm, maintained for 10 sec after which the spinning speed was increased to 3500 rpm for a minute. The coated membrane was dried in a hood for about 30 minutes followed by curing 100° C. for about 30 minutes.

To determine the $CO_2$ permeance and $CO_2:N_2$ selectivity, the membrane was placed in a small rectangular permeation cell enclosed inside a temperature control chamber. The cell comprised an upstream chamber to contact the feed against the upstream side of the membrane along with a downstream chamber to sweep the permeate from the downstream side of the membrane. The active membrane area in the cell was 2.71 cm$^2$. The feed, consisting of 25% $CO_2$ and 75% $N_2$ under ambient pressure, was contacted against the membrane at a flow rate of 60 cc/min. The permeate was swept by Ar gas under ambient pressure at a flow rate of 30 cc/min. The temperature was kept at 57° C. Under these conditions, a $CO_2$ permeance of about 330 GPU with a $CO_2/N_2$ selectivity of about 8.5 was obtained for the membrane.

Example 6

Synthesis of a Polydimethylsiloxane Covered Zeolite/Polyethersulfone Multilayer Composite Membrane with 40-Nm Zeolite Particles Zeolite Y particles with an average particle size of about 40 nm were deposited on Millipore 300 kDa PES support as described in Example 3. The membrane was spin-coated with PDMS solution as described in Example 5. The coated membrane was dried in a hood for about 30 minutes followed by curing 100° C. for about 30 minutes. For comparison, a PDMS layer was also made on a PES support without zeolite particles. For this membrane, the glycerol in the pores of the Millipore PES support was removed only after PDMS curing by overnight immersion in IPA. The IPA was removed by drying the membrane at 70° C. for 30 minutes before testing.

The $CO_2$ permeance and $CO_2:N_2$ selectivity of the membrane was determined as described in Example 6. Under these conditions, a $CO_2$ permeance of about 277 GPU with a $CO_2/N_2$ selectivity of about 9.2 was obtained. The membrane without zeolite nanoparticles showed a $CO_2$ permeance of about 2440 GPU with a $CO_2/N_2$ selectivity of about 4.6 was obtained.

Example 7

Synthesis of a Polydimethylsiloxane Selective Layer on Zeolite/Polyethersulfone Multilayer Substrate with Reduced Infiltration Zeolite Y particles with an average particle size of about 40 nm were deposited on Millipore 300 kDa PES support as described in Example 4. A PDMS solution was prepared and coated onto the zeolite particles as described in Examples 5 and 6. However, to minimize or eliminate infiltration of the PDMS solution into the zeolite layer, water was evenly spread over the surface of the zeolite layer followed by spinning at 1000 rpm for 10 sec and at 3000 rpm for 5 sec. This step was repeated five times before coating with PDMS.

The $CO_2$ permeance and $CO_2:N_2$ selectivity of the membrane was determined as described in Example 6. Under these conditions, a $CO_2$ permeance of about 2650-3930 GPU with a $CO_2/N_2$ selectivity of about 3.8 was obtained. The PDMS membranes on the PES 300 kDa support gave an average $CO_2$ permeance of about 2440 GPU with an average $CO_2/N_2$ selectivity of about 4.6.

Example 8

Synthesis of an Amine (Trlethylenetetramine+Polyvinylamine)-Based Selective Layer on Zeolite/Polyethersulfone Multilayer Substrate Zeolite Y particles with an average particle size of about 40 nm were deposited on Millipore 300 kDa PES support as described in Example 4. An amine-based coating solution was prepared as follows. Sulfonic acid salt-modified polyvinyl alcohol (PVA; Grade S-2217 from Kuraray America, Inc., Houston, Tex.; 3.177 g) was dissolved in water (18.123 g) at room temperature overnight followed by stirring at 80° C. for two hours to obtain a clear solution. Aqueous KOH solution (38.7 wt %; 3.829 g) was then added to the PVA solution and stirred for 20 minutes. Glutaraldehyde (50 wt % solution in water; 2.039 g) was then added in a proportion to crosslink about 60 mol % of the hydroxyl groups of PVA assuming complete reaction. The reaction was continued for around 150 minutes after which the reaction mixture was cooled. The amount of water in the solution before addition of glutaraldehyde was adjusted to obtain about 13.3 wt % crosslinked PVA and 5.4 wt % KOH in the product mixture.

Lupamin® (commercial polyvinylamine containing product from BASF AG, Germany; 1.727 g) was mixed with water (1.487 g), triethylenetetramine (0.165 g, linear TETA was about >60% while the rest was constituted by cyclic and branched TETA), and KOH solution (38.7 wt %; 0.419 g) to form a homogeneous carrier solution. Crosslinked PVA (1.563 g) was added dropwise to the carrier solution while stirring. Stirring was continued under a $N_2$ purge for 75 minutes. The final concentration of polymer in solution was about 22.5 wt %. The polymer solution was then cast onto the hybrid zeolite/PES hybrid substrate with an apparently negative gap setting. The cast membrane was dried immediately in a convective oven at 120° C. for 10 minutes. The final membrane contained about 21.1% crosslinked PVA, 24.8% KOH, 37.4% Lupamin® and 16.7% TETA.

To determine the $CO_2$ permeance and $CO_2$:$N_2$ selectivity, the membrane was placed in a small rectangular permeation cell enclosed inside a temperature control chamber. The cell comprised an upstream chamber to contact the feed against the upstream side of the membrane along with a downstream chamber to sweep the permeate from the downstream side of the membrane. The active membrane area in the cell was 3.4 cm². The feed, consisting of 20% $CO_2$, 40% $N_2$ and 40% $H_2$ (dry basis) under ambient pressure, was contacted against the membrane at a flow rate of 60 cc/min. The permeate was swept by Ar gas under ambient pressure at a flow rate of 30 cc/min. The temperature was kept at 102° C. Both the feed and sweep streams were mixed with water vapor to obtain 81% and 57% relative humidity, respectively, under the test conditions. Under these conditions, a $CO_2$ permeance of about 1026 GPU with a $CO_2$/$N_2$ selectivity of about 208 was obtained for the membrane. The water permeance was about 10600 GPU. The $CO_2$/$H_2$ selectivity was about 50.

Example 9

Synthesis of an Amine (Triethylenetetramine+Polyvinylamine)-Based Selective Layer on Polysulfone Substrate An amine-based coating solution was prepared as follows. First, crosslinked PVA was prepared as described in Example 8. Lupamin® (1.762 g) was mixed with water (1.802 g), triethylenetetramine (0.176 g), and KOH solution (38.7 wt %; 0.425 g) to form a homogeneous carrier solution. Crosslinked PVA (1.645 g) was added dropwise to the carrier solution while stirring. Stirring was continued under a $N_2$ purge for 90 minutes. The final concentration of polymer in solution was about 22.5 wt %. The polymer solution was then cast onto a polysulfone support (having pore sizes similar to the zeolite layer in Example 8) with an apparently negative gap setting. The cast membrane was dried immediately in a convective oven at 120° C. for 10 minutes. The final membrane contained about 21.3% crosslinked PVA, 24.8% KOH, 36.8% Lupamin® and 17.1% TETA.

The $CO_2$ permeance and $CO_2$:$N_2$ selectivity of the membrane was determined as described in Example 8. Under these conditions, a $CO_2$ permeance of about 819 GPU with a $CO_2$/$N_2$ selectivity of about 251 was obtained. The water permeance was about 4090 GPU. The $CO_2$/$H_2$ selectivity was about 53.

Example 10

Synthesis of an Amine (Potassium Salt of Aminoisobutyric Acid+Polyvinylamine)-Based Selective Layer on Zeolite/Polyethersulfone Multilayer Substrate Zeolite Y particles with an average particle size of about 40 nm were deposited on Millipore 300 kDa PES support as described in Example 4. An amine-based coating solution was prepared as follows. Sulfonic acid salt-modified PVA (3.040 g) was dissolved in water (18.150 g) at room temperature overnight followed by stirring at 80° C. for two hours to obtain a clear solution. Aqueous KOH solution (38.7 wt %; 2.080 g) was then added to the PVA solution and stirred for 20 minutes. Glutaraldehyde (50 wt % solution in water; 1.921 g) was then added in a proportion to crosslink about 60 mol % of the hydroxyl groups of PVA assuming complete reaction. The reaction was continued for around 180 minutes after which the reaction mixture was cooled. The amount of water in the solution before addition of glutaraldehyde was adjusted to obtain about 12.3 wt % crosslinked PVA and 3.1 wt % KOH in the product mixture. Separately, aminoisobutyric acid was neutralized by KOH in water for one hour to prepare a 40.8 wt % solution of the corresponding potassium salt (AIBA-K).

Lupamin® (1.244 g) was mixed with water (2.593 g), and AIBA-K (0.750 g) to form a homogeneous carrier solution. Crosslinked PVA (1.274 g) was added dropwise to the carrier solution while stirring. Stirring was continued under a $N_2$ purge for 60 minutes. The final concentration of polymer in solution was about 14.8 wt %. The polymer solution was then cast onto a zeolite/PES hybrid support with a gap setting of about 1.7 mils. The cast membrane was dried immediately in a convective oven at 120° C. for 100 minutes. The final membrane contained about 20.4% crosslinked PVA, 5% KOH, 34.7% Lupamin® and 39.9% AIBA-K.

To determine the $CO_2$ permeance and $CO_2$:$N_2$ selectivity, the membrane was placed in a small rectangular permeation cell enclosed inside a temperature control chamber. The cell comprised an upstream chamber to contact the feed against the upstream side of the membrane along with a downstream chamber to sweep the permeate from the downstream side of the membrane. The active membrane area in the cell was 3.4 cm². The feed, consisting of 18% $CO_2$, 82% $N_2$ (dry basis) under ambient pressure, was contacted against the membrane at a flow rate of 60 cc/min. The permeate was swept by Ar gas under ambient pressure at a flow rate of 30 cc/min. The temperature was kept at 102° C. Both the feed and sweep streams were mixed with water vapor to obtain 81% and 57% relative humidity, respectively, under the test conditions. Under these conditions, a $CO_2$ permeance of about 562 GPU with a $CO_2/N_2$ selectivity of about 296 was obtained for the membrane. The water permeance was about 7640 GPU.

Example 11

Synthesis of an Amine (Potassium Salt of Aminoisobutyric Acid+Polyvinylamine)-Based Selective Layer on Polysulfone Substrate An amine-based casting solution was prepared as described in Example 1. The solution was cast onto a polysulfone support (having comparable surface pore size as the zeolite/polymer hybrid substrate).

The $CO_2$ permeance and $CO_2:N_2$ selectivity of the membrane was determined as described in Example 10. Under these conditions, a $CO_2$ permeance of about 536 GPU with a $CO_2/N_2$ selectivity of about 254 was obtained. The water permeance was about 3890 GPU. The $CO_2/H_2$ selectivity was about 53.

Example 12

Synthesis of an Amine (Potassium Salt of Glycine+Polyvinylamine)-Based Selective Layer on Zeolite/Polyethersulfone Multilayer Substrate Zeolite Y particles with an average particle size of about 40 nm were deposited on Millipore 300 kDa PES support as described in Example 4. An amine-based coating solution was prepared as follows. First, crosslinked PVA and KOH was prepared as described in Example 10. Separately, glycine was neutralized by KOH in water for one hour to prepare a 24.6 wt % solution of the corresponding potassium salt (Glycine-K).

Lupamin® (1.091 g) was mixed with water (2.552 g), and Glycine-K (1.099 g) to form a homogeneous carrier solution. Crosslinked PVA (1.120 g) was added dropwise to the carrier solution while stirring. Stirring was continued under a $N_2$ purge for 120 minutes. The final concentration of polymer in solution was about 14.3 wt %. The polymer solution was then cast onto a zeolite/PES hybrid support with a gap setting of about 1.7 mils. The cast membrane was dried immediately in a convective oven at 120° C. for 90 minutes. The final membrane contained about 20.3% crosslinked PVA, 5.0% KOH, 34.6% Lupamin® and 40.1% Glycine-K.

The $CO_2$ permeance and $CO_2:N_2$ selectivity of the membrane was determined as described in Example 10. Under these conditions, a $CO_2$ permeance of about 1027 GPU with a $CO_2/N_2$ selectivity of about 885 was obtained. The water permeance was about 8720 GPU.

Example 13

Synthesis of an Amine (Potassium Salt of Glycine+Polyvinylamine)-Based Selective Layer with a Lower Thickness on Zeolite/Polyethersulfone Multilayer Substrate The amine-based casting solution was prepared as described in Example 12. However, the polymer membrane was cast with a gap-setting of 1.2 mils instead of 1.7 mils.

The $CO_2$ permeance and $CO_2:N_2$ selectivity of the membrane was determined as described in Example 10. Under these conditions, a $CO_2$ permeance of about 1168 GPU with a $CO_2/N_2$ selectivity of about 802 was obtained. The water permeance was about 11945 GPU.

Example 14

Synthesis of a Composite Membrane Containing a Zeolite/Polyethersulfone Multilayer Covered with an Amine-Containing Selective Layer Zeolite Y particles with an average particle size of about 40 nm were deposited on PES support as described in Example 4. An amine-containing coating solution was prepared and cast onto the hybrid zeolite/PES hybrid substrate as described in Example 8.

To determine the $CO_2$ permeance and $CO_2:N_2$ selectivity, the membrane was placed in a small rectangular permeation cell enclosed inside a temperature control chamber. The cell comprised an upstream chamber to contact the feed against the upstream side of the membrane along with a downstream chamber to sweep the permeate from the downstream side of the membrane. The feed, consisting of 80% $H_2O$ under ambient pressure, was contacted against the membrane at a flow rate of 60 cc/min. The permeate was swept by Ar gas under ambient pressure at a flow rate of 30 cc/min. The temperature was kept at 102° C. The $CO_2$ permeance and $CO_2/N_2$ selectivity are shown in FIGS. 9-13.

Example 15

Determination of $H_2S$ and $CO_2$ Permeance in Membranes Containing a Zeolite/Polyethersulfone Multilayer Covered with an Amine-Containing Selective Layer Zeolite Y particles with an average particle size of about 40 nm were deposited on PES support as described in Example 4. An amine-containing coating solution was prepared and cast onto the hybrid zeolite/PES hybrid substrate as described in Example 8.

Figure 14:
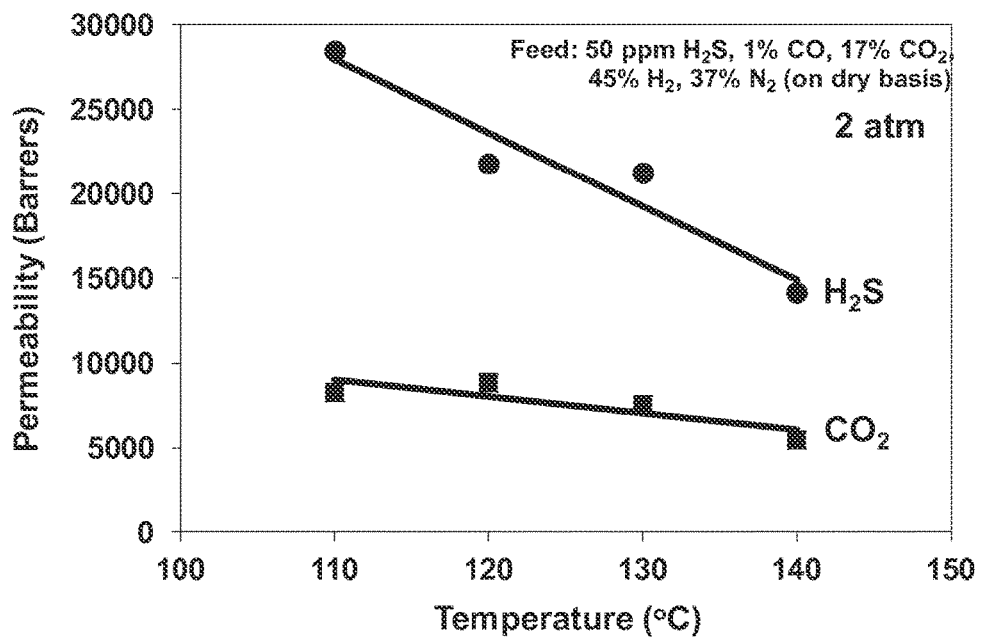
FIG. 14 is a graph showing a comparison of carbon dioxide and hydrogen sulfide permeance in the membrane.
Figure 15:
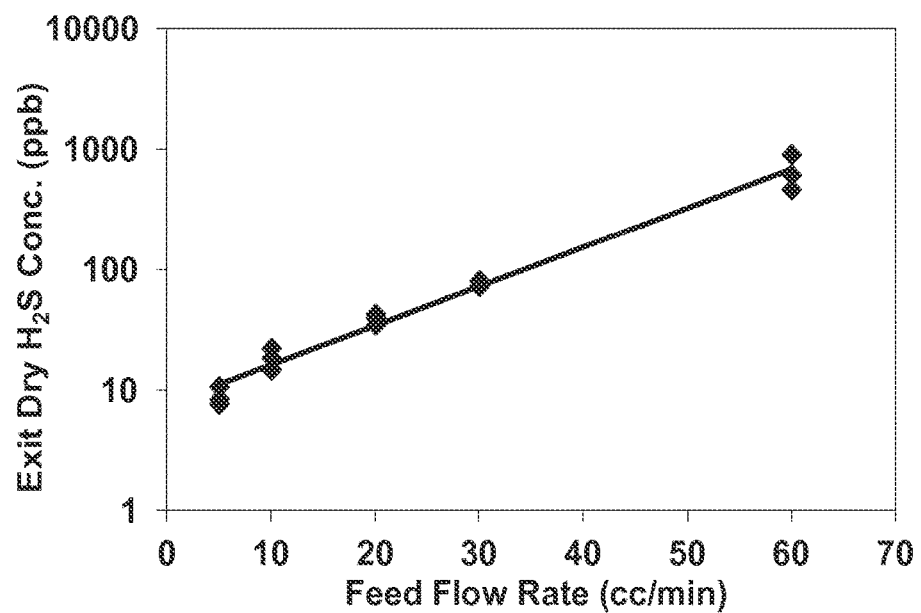
FIG. 15 is a graph showing the concentration of $H_2S$ as a function of feed flow rate in the permeate of a membrane containing a zeolite/polyethersulfone multilayer covered with an amine-containing selective layer.

To determine the $H_2S$ and $CO_2$ permeance, the membrane was placed in a small rectangular permeation cell enclosed inside a temperature control chamber. The cell comprised an upstream chamber to contact the feed against the upstream side of the membrane along with a downstream chamber to sweep the permeate from the downstream side of the membrane. The feed, consisting of 50 ppm $H_2S$, 1% CO, 17% $CO_2$, 45% $H_2$, 37% $N_2$ (dry basis) under ambient pressure, was contacted against the membrane at varying feed flow rate and temperatures as shown in FIGS. 14 and 15, respectively. The permeate was swept by Ar gas and the $H_2S$ and $CO_2$ permeance and the concentration of $H_2S$ in the permeate were determined. The $H_2S$ and $CO_2$ permeance as a function of temperature are shown in FIG. 14. The concentration of $H_2S$ in the permeate as a function of feed flow rate is shown in FIG. 15.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A membrane comprising:
a gas permeable support layer comprising a gas permeable polymer disposed on a base,
an inorganic layer disposed on the gas permeable support layer, the inorganic layer comprising a plurality of discreet nanoparticles having an average particle size of less than 1 micron, and
a selective polymer layer disposed on the inorganic layer, the selective polymer layer comprising a selective polymer having a $CO_2$:$N_2$ selectivity of at least 10 at 57° C.

2. The membrane of claim 1, wherein the gas permeable polymer comprises a polymer selected from the group consisting of polyamides, polyimides, polypyrrolones, polyesters, sulfone-based polymers, polymeric organosilicones, fluorinated polymers, polyolefins, copolymers thereof, and blends thereof.

3. The membrane of claim 1, wherein the base comprises a non-woven fabric.

4. The membrane of claim 1, wherein the nanoparticles are selected from the group consisting of alkaline earth metal oxide nanoparticles; transition metal oxide nanoparticles; lanthanide metal oxide nanoparticles; group IVA metal oxide nanoparticles;
transition metal nanoparticles; transition-metal catalyst nanoparticles; nanoparticles comprising a transition metal adsorbed on a non-reactive support; metal alloy nanoparticles; silicate nanoparticles; alumino-silicate nanoparticles; clays; and combinations thereof.

5. The membrane of claim 1, wherein the nanoparticles comprise silicate nanoparticles, alumino-silicate nanoparticles, or a combination thereof.

6. The membrane of claim 5, wherein the nanoparticles comprise zeolite Y nanoparticles.

7. The membrane of claim 1, wherein the average particle size of the nanoparticles is from 1 nm to 200 nm.

8. The membrane of claim 7, wherein the average particle size of the nanoparticles is from 1 nm to 50 nm.

9. The membrane of claim 1, wherein the selective polymer has a $CO_2$:$N_2$ selectivity of from 10 to 500 at 57° C.

10. The membrane of claim 1, wherein the selective polymer comprises a hydrophilic polymer, an amino compound, or a combination thereof.

11. The membrane of claim 10, wherein the amino compound comprises an amine-containing polymer.

12. The membrane of claim 10, wherein the amino compound comprises a low molecular weight amino compound.

13. The membrane of claim 12, wherein the low molecular weight amino compound comprises a salt of a primary amine or a salt of a secondary amine.

14. The membrane of claim 12, wherein the low molecular weight amino compound comprises an aminoacid salt defined by a general formula below

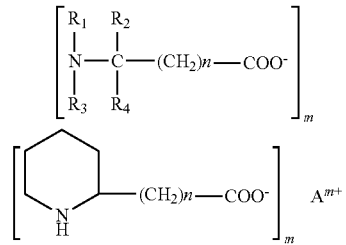

wherein $R_1$, $R_2$, $R_3$, and $R_4$ are hydrogen or hydrocarbon groups having from 1 to 4 carbon atoms, n is an integer ranging from 0 to 4, and $A^{m+}$ is a cation having a valence of 1 to 3, and m is an integer equal to the valence of the cation.

15. The membrane of claim 10, wherein the hydrophilic polymer comprises a polymer selected from the group consisting of polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof.

16. The membrane of claim 1, wherein the selective polymer further comprises a cross-linking agent.

17. A method of making a membrane comprising,
depositing a nanoparticle dispersion on a gas permeable support layer comprising a gas permeable polymer disposed on a base to form an inorganic layer disposed on the gas permeable support layer, wherein the nanoparticle dispersion comprises a plurality of discreet nanoparticles having an average particle size of less than 1 micron; and
coating the inorganic layer with a selective polymer, wherein the selective polymer exhibits a $CO_2$:$N_2$ selectivity of at least 10 at 57° C.

18. A method for separating a gaseous mixture comprising a first gas and a second gas, the method comprising contacting a membrane defined by claim 1 with the gaseous mixture under conditions effective to afford transmembrane permeation of the first gas.

19. A membrane comprising:
a gas permeable support layer,
an inorganic layer disposed on the gas permeable support layer, the inorganic layer comprising a plurality of discreet nanoparticles having an average particle size of less than 1 micron, and
a selective polymer layer disposed on the inorganic layer, the selective polymer layer comprising a selective polymer having a $CO_2$:$N_2$ selectivity of from 10 to 500 at 57° C.

* * * * *